United States Patent [19]

Sauder

[11] 4,089,721
[45] May 16, 1978

[54] METHOD OF MAKING A LAMINATE
[75] Inventor: Myrl D. Sauder, Archbold, Ohio
[73] Assignee: Sauder Woodworking Co., Archbold, Ohio
[21] Appl. No.: 780,765
[22] Filed: Mar. 24, 1977
[51] Int. Cl.² .................... B32B 3/04; B29C 17/04;
[52] U.S. Cl. ................................. 156/212; 156/216; 428/537
[58] Field of Search ............... 156/212, 216, 202 428/192; 511; 537; 161; 165; 121

[56] References Cited

U.S. PATENT DOCUMENTS

| | | | |
|---|---|---|---|
| 3,013,919 | 12/1961 | Bialy | 156/212 |
| 3,296,052 | 1/1967 | Bechtold | 156/212 |
| 3,382,124 | 5/1968 | Briskey | 156/212 |
| 3,690,995 | 9/1972 | Loy | 156/212 |

*Primary Examiner*—Douglas J. Drummond
*Attorney, Agent, or Firm*—Richard D. Emch

[57] ABSTRACT

The invention disclosed relates to a method of making laminated products such as furniture, cabinets, counters and the like. A laminate formed of thermosetting polyester saturated on paper of 8-12 mil thickness is bonded with a thermoplastic, thermoforming acrylic saturated on paper of 12-18 mil thickness. The bonded layers are shaped over at least two surfaces angularly positioned relative to each other. For examples, the bonded layers are shaped around sharp corners or edges of a substrate, such as conventional fiberboard, particle board or wood, under heat and pressure. A hot melt adhesive, preferably coated on the inner surface of the bonded laminate attaches the laminate to the one plane surface of the substrate and bending pressure is applied as the substrate and laminate pass through a series of rollers to bend the laminate in degrees around the corners and into contact with the other surface of the substrate. Pressures are in the 20-200 psi range and at temperature in the range of 350°-450° F. A superior product having a contiguous surface laminate on the substrate provides an element or elements for the manufactured article possessing heat and mar resistance.

9 Claims, 7 Drawing Figures

U.S.Patent May 16, 1978 4,089,721
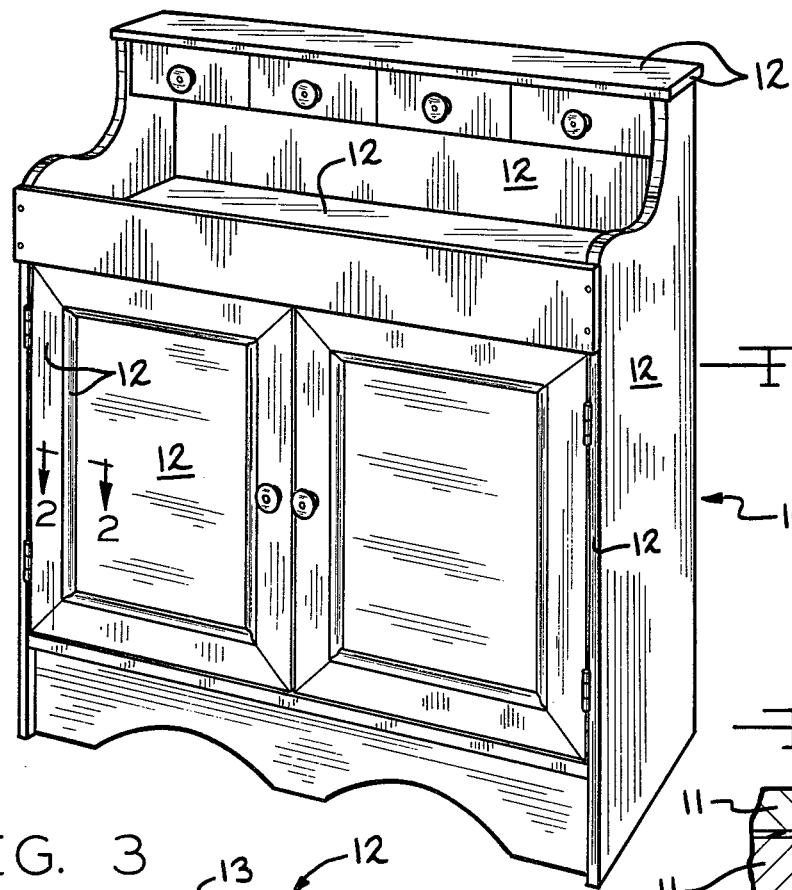
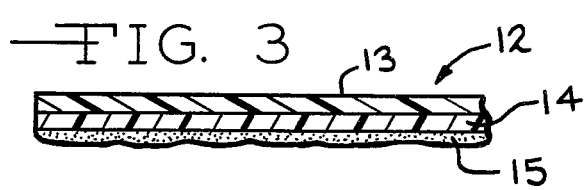
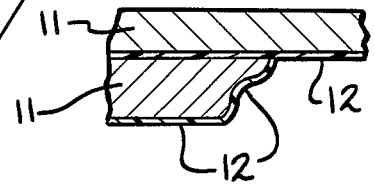
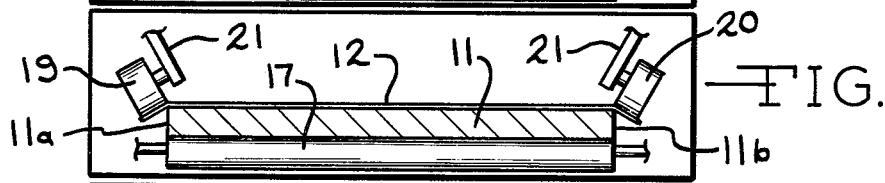
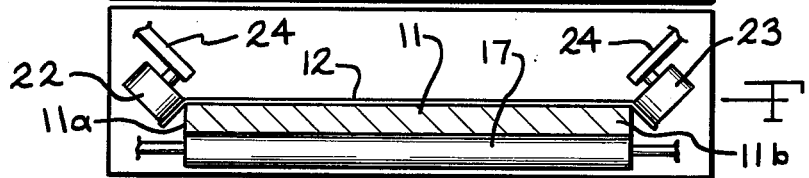
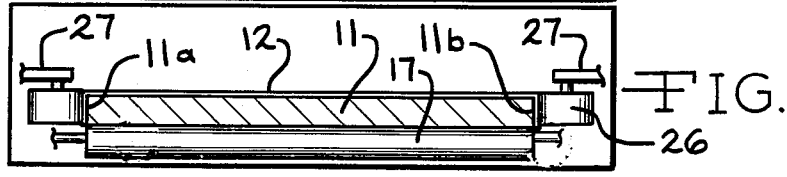

METHOD OF MAKING A LAMINATE

The invention relates to an article of furniture or cabinetry, and a method of making same; and more particularly to a surface lamina over a substrate, such as a laminated wood product panel. The laminate possesses properties of mar resistance, heat resistance, and pattern regularity, and at the same time may be bent over sharp contours on the substrate.

BACKGROUND OF THE INVENTION

In the manufacture of furniture, cabinets, counter tops and the like, it is known to apply a surface laminate of a thermo-setting sheet material over a planar portion of the article having a desired color or pattern, and having heat resistant properties. The thermoset materials most often used are of the polyester type, such as sold under the trade name of "Formica."

One of the properties of the prepared thermo-setting sheet lamina, which poses a problem in its use, is the inability to form such matarials around sharp corners and bends of contour without breakage, cracking or the like. Such sheet material will withstand some bending, but universally is not readily formable over panel surfaces with irregularities and right-angled edges thereon which are to be covered. As a result, prior practices require the thermo-setting polyester sheet be applied to the substrate in cut segments and the seams are covered by a flashing or the like. Additionally, care must be used to match a pattern between the segments. These steps increase the cost of manufacture of the furniture item and reduce production rate, especially in time of application and reworking of improper application.

SUMMARY OF THE INVENTION

The present invention provides an improvement in the method of manufacturing lamina-faced furniture items, cabinets, counters and like articles, herein generally referred to as "laminated products."

The lamina, hereinafter disclosed in detail, is a combination of a sheet ply of a thermosetting polyester surface lamina having a surface pattern and decoration or the like on its face with a sheet ply of an underlying sheet lamina of a thermoplastic. In the thickness of practical application, the two combined lamina are readily capable of assembly around sharp contours on a substrate, such as a panel or portion of a wood cabinet, and provide an integral facing over adjoining surfaces of the laminated product wherein the surfaces join at a sharp angle (on the order of 90° or greater). This laminate also provides a means of surface covering of items having fine detail of contour, including small radii (⅛ inch or less) in surface relief on the product face. The lamina may also be applied readily on inside wrap contours and corners of elements of furniture or the like.

The laminate is first made from the two sheets of dissimilar plastics by thermal fusion of one layer to the other, by heat and pressure to form the laminate composite of the thermosetting ply and the thermoplastic ply. The layers are surface-joined in a laminating press and by the technique disclosed in my co-pending application, Ser. No. 560,790, filed Mar. 5, 1976. Thickness of the two layers is similar; for example, a thermosetting web comprised of a polyester in the range of 8-12 mils in thickness is used with a thermoplastic web comprised of an acrylic composition in the range of 12-18 mils thick.

In the method of the invention, the substrate material from which the furniture elements are to be formed is wrapped or covered with the laminate material, just described, and the pieces cut therefrom utilizing conventional techniques. The substrate material may be a medium density fiberboard, particle board, plywood or wood, which are herein referred to as a wood product substrate. The substrate material to be used in making a furniture piece is processed in applying the laminate of the two materials. The substrate piece is passed on rollers and the plastic laminate is furnished from a web or sheet laid over the substrate surface. The thermosetting layer faces away from the substrate surface and the thermoplastic layer is adjacent the substrate. An adhesive, such as a hot melt adhesive composition, may be conveniently applied to the back face of the laminate, i.e., along the exposed thermoplastic surface layer, optionally in advance, such that the laminate web carries the adhesive to the substrate. The preferred adhesive is a high viscosity hot melt adhesive compound activated by heat the pressure in a temperature range of 350°-450° F. The laminate web is sized in width to cover the surfaces desired of the substrate element. The two are subjected to heat and pressure as the laminate passes through a series of rollers and is worked into intimate contact with the substrate by pressing and, where needed, by bending, then pressing. The web covers the surfaces of the furniture substrate material and is adhered by reactivating the hot melt adhesive at temperatures employed in the steps of uniting the laminate to the substrate under heat and pressure.

In the working of the laminate onto the substrate, the thermosetting layer is carried faithfully with the thermoplastic layer, and since the thermoplastic layer is capable of either some compression or some stretching, the thermoset layer thereon may be readily worked around square corners. Thus, the method of making laminated products, such as the class described herein, is simplified and enhanced by production of a superior product not heretofore available. The end product has a hard, durable, heat-resistant, contiguous surface covering sharp edges and corners and is atractive.

As will be apparent from the detailed description hereinafter set forth of a preferred embodiment of the invention, several further advantages and modifications may occur to those skilled in the art.

BRIEF DESCRIPTION OF THE DRAWINGS

FIG. 1 is a front perspective view of an exemplary furniture piece made in accordance with the invention;

FIG. 2 is a fragmentary sectional view taken along line 2—2 on FIG. 1;

FIG. 3 is an enlarged sectional view of the plastic laminate of the invention; and FIGS. 4–7 illustrate a sequence of steps in performing the method of the invention.

DETAILED DESCRIPTION OF THE INVENTION

As shown in FIG. 1, an article of furniture 10, such as the dry sink shown, is fabricated from material that comprises a cellulose fiber substrate layer 11 (FIG. 2) and a composite surface laminate 12. The substrate 11 preferably is selected from a medium density fiberboard, particle board or wood. Thicknesses for th various pieces which go into making article 10 are well known to those skilled in the furniture industry. The composite laminate 12 is made from a layer of thermosetting sheet or web material 13 united with an underlayer of a thermoplastic sheet or web material 14. The enlarged section on FIG. 3 illustrates the composite or laminate 12. The sheet 13 is a polyester and in an example is available commercially in the range of 8-12 mils in thickness as a sheet of paper saturated with a polyester thermosetting resin. The sheet 14 is an acrylic-saturated paper sheet that is available commercially in the range of 12-18 mils in thickness.

The sheet 13 is fusion-bonded with sheet 14 as a composite laminate by passing both sheets through a laminating press, as is disclosed in my aforementioned copending application Ser. No. 560,790, wherein the outer layer of thermosetting material is thermally fused to the inner layer. The layer 13 preferably includes a pattern of a wood grain as desired for article 10. The laminate 12 is applied to substrate 11 by adhesive, preferably a high viscosity hot melt adhesive layer 15 that is coated on the back surface of laminate 12. The layer 15 is nontacky at room temperature and may be activated at a temperature in the range of 350°-450° F. The substrate stock 11 and laminate 12 are simultaneously processed through a series of rollers, as illustrated on FIGS. 4-7.

As shown in FIG. 4, substrate 11 and laminate 12 with adhesive layer 15 thereon are passed between a bed roller 16 and pressure roller 17 with force being applied by arms 18. The laminate piece 12 extends laterally on either side of the substrate piece 11 by an amount approximately equal to the thickness of piece 11. The pressure applied by pressure roll 16 is simultaneously accompanied by heating the laminate to the 350°-450° F. range, thereby activating the underlying adhesive (15 on FIG. 3). The air pockets and wrinkles, if any, will be removed from the interface between laminate and substrate in this step.

In the same environment of temperature as in the step of FIG. 4, substrate 11 and laminate 12 move past angled side rollers 19 and 20 (FIG. 5) each mounted on an axis of rotation tilted at an angle of about 30° from horizontal and angled inwardly toward the vertical surfaces 11a and 11b of the substrate. The rollers are carried on a set of arms manipulated toward the workpiece to apply the pressure needed to bend the laminate 12 about the corner edge. The active roller face engages the laminate overhang at about this corner edge of the substrate. The rollers 19 and 20 in combination bend the laminate piece at the corner where the top face and vertical face of substrate 11 meet. This corner is approximately a right angle (90°).

As seen on FIG. 6, the piece 11 and laminate advance past a second set of rollers 22 and 23 each rotatably mounted with their axes at an advanced angle of about 60° and carried by their arms 24. Engagement of the overhanging margins of laminate 12 by these angled rollers 22, 23 bend the material further, approximately to an angle of 60° from horizontal and about the edge corner of the substrate. The arms 24 manipulate the rollers 22, 23 to apply proper pressure.

As shown on FIG. 7, the substrate piece 11 and laminate 12 are carried past another set of rollers 25 and 26, each rotatably supported on a vertical axis and manipulated by the arms 27 to apply pressure against the laminate. The engagement of the already bent margins of the sheet by rollers 25, 26 bends the edge portions of the laminate against vertical faces 11a and 11b, respectively, of the substrate piece 11 and the arms 27 apply further pressure to bend these portions firmly onto the board.

In all of the method steps performed and illustrated by FIGS. 4-7, the laminate and substrate board are in an environment of temperature elevated to the aforementioned 350°-450° F. range. Accordingly, the heat applied will activate the hot melt adhesive along the marginal portions of the laminate sheet 12 and combined with the pressure applied by the set of rollers 25, 26 firmly bond the shaped laminate sheet 12 along the surfaces 11a and 11b.

Pressure is applied to bend the laminate at successively greater degrees around the corner edges of the substrate board. The rollers of sets 19, 20 and 22, 23 and 25, 26 apply pressure ranging from 20-200 psi. The substrate board 11 is wrapped on one or more of its side faces with a contiguous, unbroken piece of the laminate. The wrapped surfaces are now possessed of mar resistance, heat resistance properties, and inasmuch as the laminate is applied in a contiguous, single piece in the method, the pattern match in the product is perfect. Moreover, sharp, cut edges of the finished laminate on substrate are eliminated because the sheet is bent around the edge rather than being seamed and joined at the edge.

Under the process above-described, in some cases marginal portions may be bent around sharp corners successfully utilizing two sets of the angled rollers set at 45° and 90° from the top plane of the board undergoing wrapping. In all cases, at least two roller steps must be employed in bending the laminate about a right angle corner, such as is illustrated herein.

On the other hand, a one-step pass through a single set of rollers may be employed in other applications, such as on the inside wrap of a laminate of this type or in bending the laminate into moderate grooves or ferries on a board piece.

As used herein, the term "thermo-forming plastic" means an organic plastic material that is pliable when subjected to heat. The term "thermo-setting plastic" means an organic plastic material that sets or hardens when subjected to heat and cannot be re-softened or reformed with subsequent heating after setting or hardening, and possesses good heat-resistant properties desirable in laminated products of the type described.

Having described the invention in some detail with respect to one embodiment thereof, other and further modifications and variants of the invention will occur to those skilled in the art and which can be effected within the spirit and scope of the invention, as described hereinabove, and as defined in the appended claims.

I claim:

1. The method of making laminated furniture products comprising:

providing a rigid wood product substrate having plural planar surfaces, at least two of said planar surfaces intersecting at a substantially right angle forming a sharp corner thereof, placing a sheet of substantially organic laminate material over one planar surface of said substrate, a free portion of said laminate sheet extending beyond said sharp corner of the substrate, said organic laminate comprising a first lamina of a thermo-formable, thermoplastic material and a second lamina of a thermosetting material bonded to said first lamina, said first lamina thereof being placed nearest the one planar surface of the substrate, a thermally reactive adhesive being interposed between the laminate and the substrate, heating the substrate and laminate to elevated temperature, and applying pressure to the heated laminate to
  bond the laminate to the one planar surface, and then to
  bend the laminate free portion by degrees tightly around said sharp corner and into intimate adhesively-bonded contact on another planar surface of the substrate adjacent said corner.

2. The method of claim 1 in which the bending and bonding of the laminate free portion by degrees comprising contacting said laminate portion in series by at least two angled rollers, each roller of the series angled to a greater degree from said one plane of the substrate for bendng said portion around the sharp corner and onto the other said planar surface of the substrate.

3. The method of claim 2 in which three angled rollers are employed in series for bending said free portion of the laminate onto said other planar surface of the substrate.

4. The method of claim 3, in which said rollers apply pressure in the range of 20–200 psi.

5. The method of claim 3 in which said three rollers are angled successively by 30° increments beyond the one planar surface of the substrate and each engage the laminate free portion adjacent said sharp corner intersection of the said planar surfaces of the substrate for bending the laminate.

6. The method of claim 1 in which the first lamina comprises an acrylic material and the second lamina comprises a polyester material.

7. The method of claim 6 in which said first lamina comprises a sheet of cellulose fiber saturated with acrylic that is in the range of 12–18 mils in thickness, and the second lamina comprises a sheet of cellulose fiber saturated with polyester that is in the range of 8–12 mils in thickness, said sheets being bonded together to form said organic laminate.

8. The method of claim 7 in which said second lamina also includes an exterior surface pattern therein.

9. The method of claim 1 in which said laminate sheet includes a coating of high-viscosity hot melt adhesive on the exterior surface of said first lamina, thereby interposing a thermally reactive adhesive between the laminate and the substrate.

* * * * *